US012442476B2

(12) United States Patent
Axelsson et al.

(10) Patent No.: US 12,442,476 B2
(45) Date of Patent: Oct. 14, 2025

(54) COUPLING DEVICE WITH COATING

(71) Applicant: Interlinked AB, Stockholm (SE)

(72) Inventors: Robert Axelsson, Gränna (SE);
Katarina Hedbeck, Stockholm (SE);
Rebecca Bejhed, Uppsala (SE);
Christopher Blacker, Uppsala (SE)

(73) Assignee: Interlinked AB (SE)

( * ) Notice: Subject to any disclaimer, the term of this patent is extended or adjusted under 35 U.S.C. 154(b) by 70 days.

(21) Appl. No.: 18/580,907

(22) PCT Filed: Jun. 30, 2022

(86) PCT No.: PCT/EP2022/068155
§ 371 (c)(1),
(2) Date: Jan. 19, 2024

(87) PCT Pub. No.: WO2023/001524
PCT Pub. Date: Jan. 26, 2023

(65) Prior Publication Data
US 2024/0230000 A1 Jul. 11, 2024

(30) Foreign Application Priority Data

Jul. 19, 2021 (EP) ..................................... 21186504

(51) Int. Cl.
*F16L 37/30* (2006.01)
*A61M 39/08* (2006.01)
*F16L 37/252* (2006.01)

(52) U.S. Cl.
CPC .............. *F16L 37/30* (2013.01); *A61M 39/08* (2013.01); *F16L 37/252* (2013.01)

(58) Field of Classification Search
CPC ........ F16L 37/30; F16L 37/252; A61M 39/18; A61M 39/10; A61M 39/162; A61M 2039/1016; A61M 2039/1072
See application file for complete search history.

(56) References Cited

U.S. PATENT DOCUMENTS 4,256,106 A 3/1981 Shoor
6,181,287 B1 * 1/2001 Beigel ................ G08B 13/2431
343/741

(Continued)

FOREIGN PATENT DOCUMENTS

WO 2018087153 A1 5/2018

*Primary Examiner* — Patrick C Williams
(74) *Attorney, Agent, or Firm* — Condo Roccia Koptiw LLP

(57) ABSTRACT

A coupling device (100) for transferring a fluid is provided. The coupling device comprises a first housing (110), a tube (140) and a first sealing element (220). The coupling device further comprises a second housing (300) comprising a channel (310) and a second sealing element (320). At a first and second stage of a connection of the coupling device, the first and second sealing elements, of which at least one comprises an antimicrobial coating, are configured to abut each other and sealingly separate the tube and the channel, whereafter the tube projects through the first and second sealing elements for enabling a transfer through the coupling device. At a first and second stage of a disconnection of the coupling device, first (400) and second spaces (410) are respectively defined for enclosing the fluid, whereby the fluid is arranged to come into contact with the antimicrobial coating.

14 Claims, 9 Drawing Sheets

(56) References Cited

U.S. PATENT DOCUMENTS

2003/0153865 A1\* 8/2003 Connell ................ A61M 39/20
604/28
2003/0181849 A1\* 9/2003 Castellanos ........... A61M 1/282
604/533

\* cited by examiner

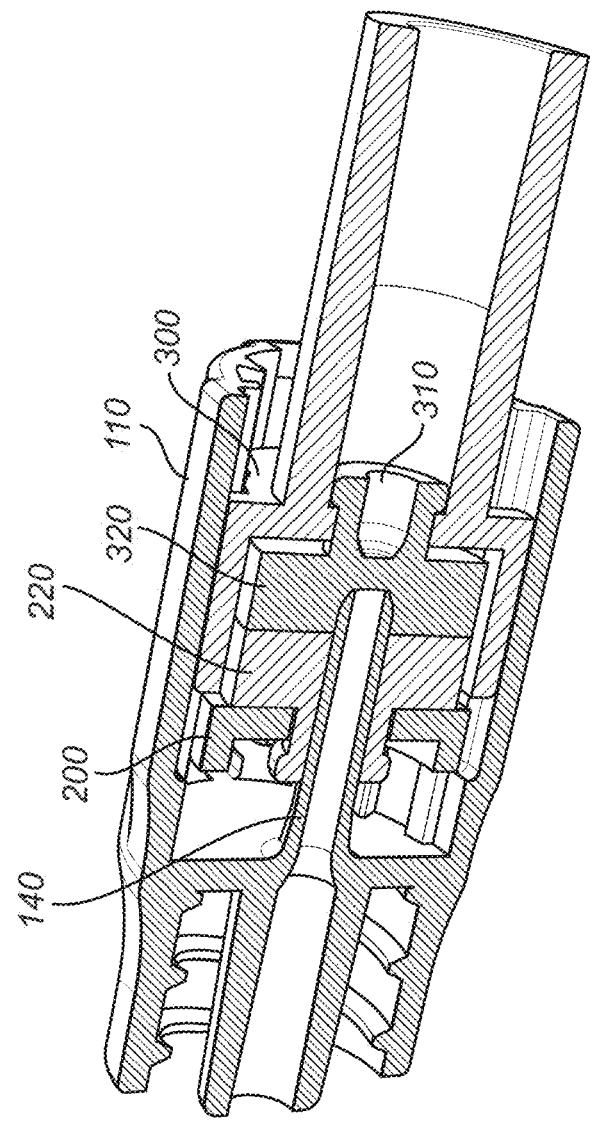

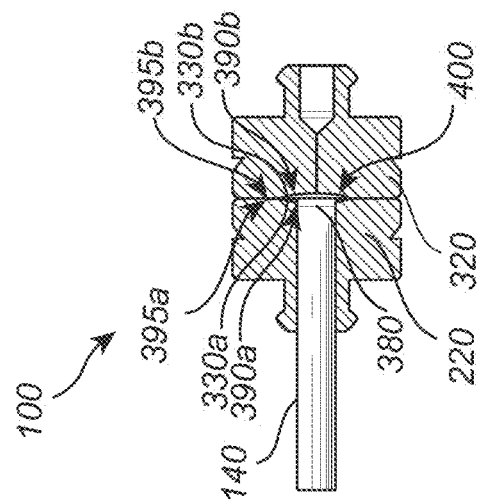
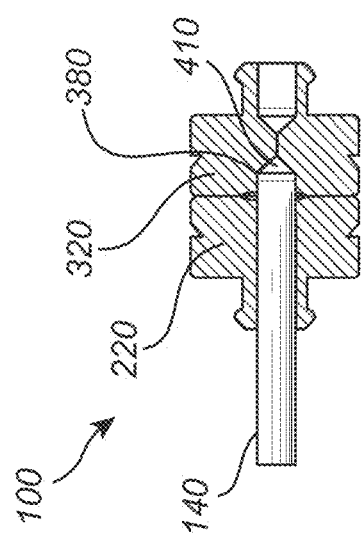
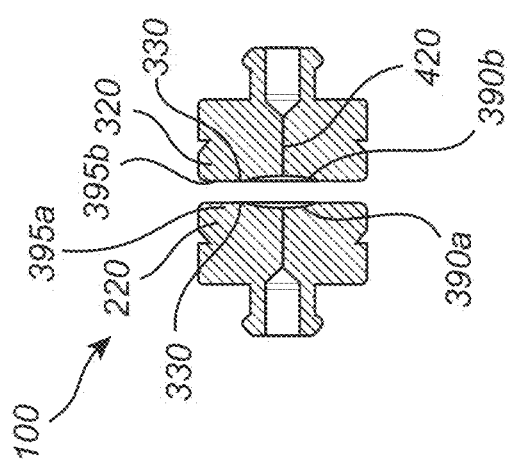
Fig. 4c
Fig. 4b
Fig. 4a

COUPLING DEVICE WITH COATING

CROSS REFERENCE TO RELATED APPLICATIONS

This application is the National Stage Entry under 35 U.S.C. § 371 of Patent Cooperation Treaty Application No. PCT/EP2022/068155, filed 30 Jun. 2022, which claims benefit from EPC Application No. 21186504.3 filed 19 Jul. 2021, the contents of each of which are hereby incorporated by reference herein in their entireties.

FIELD OF THE INVENTION

The present invention generally relates to the field of medical devices. More specifically, the present invention relates to a coupling device for transferring a fluid.

BACKGROUND OF THE INVENTION

During patient treatments, there may be a need of transferring one or more fluids (blood, blood products, one or more medicines, etc.) to and/or from a patient. As the fluid often is supplied via an element (e.g. a needle, cannula, catheter, trocar, or the like) inserted into the patient during treatments of this kind, it is desirable that the element remains relatively fixed after insertion into the patient. Involuntarily displacements and/or movements of the element after insertion into the patient may arise in case the patient or any medical staff accidentally pulls a tube connected to the element. Furthermore, stumbling accidents of the patient and/or medical staff over a tube connected to an element may also lead to element displacements. It will be appreciated that displacements of this kind of an element may not only be painful for the patient but may also lead to consequences of the treatment if the transferring of fluid due to the element's displacement is not performed correctly. Furthermore, it should be noted that pulling an element inserted into a patient with force could damage the vessel of a patient. Furthermore, for a patient with a compromised immune system, a wounded vessel could lead to a serious infection.

In addition, in case of an accidental pulling of a tube for a transfer of a fluid to a patient, it is desirable that any leakage of the fluid is mitigated. For example, if the infusion liquid is toxic, any leakage from a broken tube may be especially hazardous.

WO 2018/087153 A1 discloses a coupling device for medical purposes. The coupling device provides sealing and anti-leakage properties, both during a transfer of fluid through the coupling device as well as during an interrupted flow of fluid through the coupling device as a result of a detachment or disconnection of the coupling device. Furthermore, the coupling device mitigates effects of a tube exposed to forces, e.g. pulling forces, and in particular when the tube is connected to an element for transferring a fluid to/from a patient.

The adherence of colonies of bacteria and/or formations of biofilms to medical devices in general is a potential risk source, as patients may be infected via the medical devices during treatment. Consequently, there is a wish to mitigate this risk also for coupling devices for transferring fluids to and/or from a patient.

Hence, it is desired to provide alternatives to coupling devices of the prior art. More specifically, there is a wish to provide coupling devices which have excellent sealing and anti-leakage properties, as well as being able to mitigate effects of a tube exposed to forces, e.g. pulling forces, when the tube is used for transferring a fluid to/from a patient, while the coupling device furthermore provides antimicrobial properties.

SUMMARY OF THE INVENTION

It is an object of the present invention to mitigate one or more of the above problems and to provide a device for medical purposes which may conveniently mitigate effects of a tube exposed to forces, e.g. pulling forces, and in particular when the tube is connected to an element for transferring a fluid to/from a patient, wherein the device furthermore has excellent sealing and anti-leakage properties as well as providing antimicrobial properties for an increased patient and/or medical staff safety.

This and other objects are achieved by providing a coupling device having the features in the independent claim. Preferred embodiments are defined in the dependent claims.

Hence, according to a first aspect of the present invention, there is provided a coupling device for transferring a fluid. The coupling device comprises a first housing extending along a principal axis A. The first housing comprises a first opening at a back end portion thereof and a second opening at a front end portion thereof. Moreover, the coupling device comprises a tube extending from the first opening into the first housing along the principal axis, A. The first housing comprises a first sealing element. Furthermore, the coupling device comprises a second housing comprising a channel through the second housing and a second sealing element arranged to seal the channel. At least one of the first and the second sealing elements comprises an antimicrobial coating. At a first stage of a connection of the coupling device, the second housing is insertable into the first housing via the second opening thereof, wherein the first and second sealing elements are configured to abut each other and sealingly separate the tube and the channel. By the term "sealingly separate", it is here meant that the first sealing element and the second sealing element separate the tube and the channel in a sealing manner, such that no fluid can pass between the tube and the channel. At a second stage of the connection of the coupling device, the tube projects through the first and second sealing elements for connection with the channel for enabling a transfer of fluid through the coupling device. At a first stage of a disconnection of the coupling device, wherein the tube is retracted through the first and second sealing elements and an end portion of the tube is enclosed by the second sealing element, the tube and the second sealing element are configured to define a first space at the end portion of the tube, wherein the first space is at least partially filled with the fluid. At a second stage of the disconnection of the coupling device, wherein the tube is retracted through the first sealing element and the end portion of the tube is in close vicinity of the second sealing element, the tube, the first sealing element and the second sealing element are configured to define a second space at the end portion of the tube, wherein the fluid in the first space is released into the second space upon collapse of the first space, and wherein the fluid in the first space comes into contact with at least one of at least a portion of the antimicrobial coating of the first sealing element, and at least a portion of the antimicrobial coating of the second sealing element. The antimicrobial coating is configured to provide an antimicrobial effect upon contact with the fluid.

According to a second aspect of the present invention, there is provided a coupling device for transferring a fluid.

The coupling device comprises a first housing extending along a principal axis A. The first housing comprises a first opening at a back end portion thereof and a second opening at a front end portion thereof. Moreover, the coupling device comprises a tube extending from the first opening into the first housing along the principal axis, A. The first housing comprises a first sealing element. Furthermore, the coupling device comprises a second housing comprising a channel through the second housing and a second sealing element arranged to seal the channel. At least one of the first and the second sealing elements comprises an antimicrobial coating and a cavity on a front side of the respective first and second sealing element. At a first stage of a connection of the coupling device, the second housing is insertable into the first housing via the second opening thereof, wherein the first and second sealing elements are configured to abut each other and sealingly separate the tube and the channel, wherein the cavity of at least one of the first and second sealing elements defines a first space upon contact between the first and second sealing elements. At a second stage of the connection of the coupling device, the tube projects through the first and second sealing elements for connection with the channel for enabling a transfer of fluid through the coupling device. At a first stage of a disconnection of the coupling device, wherein the tube is retracted through the first and second sealing elements and an end portion of the tube is enclosed by the second sealing element, the tube and the second sealing element are configured to define a second space at the end portion of the tube, wherein the second space is at least partially filled with the fluid. At a second stage of the disconnection of the coupling device, wherein the tube is retracted through the first sealing element and the end portion of the tube is in close vicinity of the second sealing element, the fluid in the second space is released into the first space upon collapse of the second space, and wherein the fluid in the first space comes into contact with at least one of at least a portion of the antimicrobial coating of the first sealing element, and at least a portion of the antimicrobial coating of the second sealing element. The antimicrobial coating is configured to provide an antimicrobial effect upon contact with the fluid.

Thus, the present invention is based on the idea of providing a coupling device for transferring a fluid, wherein the coupling device may enable a transfer of fluid through the coupling device which is sealed to the outside environment when the coupling device is connected, and a leak-free interruption of a transfer of a fluid in case the coupling device is disconnected. More specifically, upon connection of the coupling device, i.e. at the first stage of the connection of the coupling device, the first and second sealing elements firstly provide a sealing upon abutment with each other according to the first aspect of the present invention. According to the second aspect of the present invention, the cavities of the front sides of the first and second sealing elements define a first space upon contact between the first and second sealing elements. Thereafter, at the second stage of the connection of the coupling device, a transfer of fluid is enabled by the tube of the coupling device, projecting through (penetrating) the first and second sealing elements. Upon disconnection of the coupling device, i.e. at the first stage of the disconnection of the coupling device, which disconnection may be triggered by a pulling force applied to the coupling device, the tube is retracted through the first and second sealing elements and an end portion of the tube is enclosed by the second sealing element. At this first stage, according to the first aspect of the present invention, the tube and the second sealing element are configured to define a first space at the end portion of the tube, wherein the first space is at least partially filled with the fluid. Hence, the volume of the first space is a function of the properties of the tube and the second sealing element. Alternatively, at this first stage, according to the second aspect of the present invention, the tube and the second sealing element are configured to define a second space at the end portion of the tube, wherein the second space is at least partially filled with the fluid.

At a second stage of the disconnection of the coupling device, the tube has been retracted through the first sealing element and the end portion of the tube is in close vicinity of the second sealing element. At this second stage according to the first aspect of the present invention, the tube, the first and second sealing elements are configured to define a second space at the end portion of the tube. Hence, the volume of the second space is a function of the properties of the tube and the first sealing element. As the tube has been retracted through the first sealing element, the first space has collapsed (collapses) and the fluid from the first space is released into the second space, as the first space and the second space are in fluid communication upon collapse of the first space. The fluid in the first space, which hence is released into the second space, comes into contact with at least a portion of the antimicrobial coating of the first sealing element and/or at least a portion of the antimicrobial coating of the second sealing element.

At the second stage according to the second aspect of the present invention, the fluid in the second space is released into the first space, as the first space and the second space are in fluid communication upon collapse of the second space. The fluid in the first space comes into contact with at least a portion of the antimicrobial coating of the first sealing element and/or at least a portion of the antimicrobial coating of the second sealing element.

The effect of the antimicrobial coating, when coming into contact with the fluid, is a disinfection effect by the killing of bacteria and/or fungus.

Consequently, after the disconnection of the coupling device, i.e. including the first and second stages of the disconnection of the coupling device, the coupling device subsequently becomes sealed again by the first and second sealing elements. In other words, the respective first and second sealing elements may conveniently stop a flow on either side of the respective sealing elements upon disconnection/detachment of the coupling device. Furthermore, by the fluid's contact with the antimicrobial coating of the first and second sealing elements, a growth and/or adherence of colonies of bacteria, fungi and/or formations of biofilms to the first and/or second sealing elements is mitigated. Hence, the coupling device of the present invention may provide excellent sealing properties and avoid leakage, both during a transfer of fluid through the coupling device as well as during an interrupted flow of fluid through the coupling device as a result of a detachment or disconnection of the coupling device, while the coupling device furthermore provides antimicrobial properties due to its antimicrobial coating.

Based on the above, it should be noted that the first aspect and the second aspect of the present invention are linked as to form a single general inventive concept. In other words, the first aspect and the second aspect of the present invention are alternative solutions to a particular problem.

It will be appreciated that the ability of the coupling device to mitigate any leakage of fluid is advantageous for reasons of safety. For example, in case the coupling device is provided for a transfer of a toxic liquid, any leakage from the coupling device may be particularly hazardous. Hence, the coupling device of the present invention may significantly increase the safety of medical staff and/or patients.

Furthermore, the coupling device of the present invention is advantageous in that it may save fluid by its advantageous sealing properties. For example, in case the coupling device is used for a transfer of blood, the coupling device may mitigate any loss of blood and/or a contamination of the environment caused by a leakage in case of a detachment of the coupling device. Furthermore, by its excellent sealing properties, the coupling device may mitigate any contamination of the fluid (e.g. blood) transferred through the (connected) coupling device.

The present invention is further advantageous in that the coupling device provides a convenient detachment (disconnection) of the coupling device. For example, if the coupling device is connected to a tube for medical purposes, a pulling of the tube, e.g. by a patient and/or medical staff, may detach the second housing from the first housing of the coupling device, thereby mitigating any further pulling of the tube at the other end thereof. It will be appreciated that it may be desirable that (medical) tubes commonly used at hospitals, nursing homes, clinics, etc., are equipped with a coupling device of the present invention, as the coupling device may constitute a "weak link" of the tube. Hence, if a tube is connected between a patient and a source (e.g. an infusion pump or bag) and further comprises a coupling device according to the present invention, the coupling device may constitute the "weak link" of the tube where the tube may be "cut off" as a result of a pulling of the tube.

The coupling device is especially advantageous in case it is provided to a medical tube which in turn is connected to an element inserted into a patient for a transfer of fluid to and/or from the patient. This is realized as a displacement of the element may not only be painful for the patient, but may also lead to consequences of the patient's treatment if the transferring of fluid due to the element's displacement is not performed correctly. By the coupling device of the present invention, provided to a medical tube for medical purposes, it will be appreciated that equipment connected to the tube such as (infusion) elements, pumps and/or bags, etc., may be spared from damage caused by a pulling of the medical tube.

By the coupling device of the present invention, provided to a medical tube, it will be appreciated that equipment connected to the medical tube such as (infusion) elements, pumps and/or bags, etc., may be spared from damage caused by a pulling of the medical tube.

The coupling device of the present invention is further advantageous in that consequences related to medical staff and/or patients tripping and/or falling over (a) medical tube(s) comprising one or more coupling devices may be mitigated.

The coupling device of the present invention is further advantageous in that it is easily, conveniently and efficiently (re)connected if detached or disconnected. For example, in case a medical tube comprising a coupling device according to the present invention is pulled apart, it may be desirable to be able to reinstate the (infusion) therapy again as quickly as possible. The coupling device meets this demand, as the (re)connection of the coupling device may be performed quickly and intuitively due to the innovative configuration of the coupling device.

Regarding the first aspect of the present invention, the coupling device of the present invention is further advantageous in that the creation of the first space in the second sealing element, at the first stage of the disconnection of the coupling device, and the creation of the second space at the second stage of the disconnection of the coupling device, provide a convenient operation of allowing the antimicrobial coating of the first and/or second sealing element to come into contact with the fluid. Analogously, regarding the second aspect of the present invention, the coupling device of the present invention is advantageous in that the creation of the second space in the second sealing element, at the first stage of the disconnection of the coupling device, and the provision of the first space defined by the cavities of the first and second sealing elements, provide a convenient operation of allowing the antimicrobial coating of the first and/or second sealing element to come into contact with the fluid. It will be appreciated that this operation may be repeated, i.e. that the coupling device according to the first and/or second aspect of the present invention may be connected and disconnected several times, wherein the coating may come into contact with the fluid.

The coupling device of the present invention is further advantageous in that its components (e.g. the first and/or second housing, the first and second sealing elements, etc.) are designed to have relatively smooth outer surfaces, such that they may be cleaned and/or disinfected in an easy and efficient manner. For example, after a cleaning and/or disinfection of a dissembled coupling device, the respective components of the coupling device may subsequently be reassembled into the coupling device.

The coupling device of the present invention is further advantageous in that it is relatively inexpensive to manufacture and is easily assembled. Consequently, the coupling device may primarily be designed for single-use, i.e. the coupling device may for example be used for one patient and one therapy (e.g. infusion).

The coupling device of the present invention is further advantageous in that its design minimizes dead space of the fluid path through the coupling device, thereby mitigating the occurrence of infectious agents. Furthermore, the inventive design of the coupling device mitigates leakage of the fluid.

The coupling device of the present invention is further advantageous in that the flow of fluid through the coupling device is linear along the principal axis of the coupling device. In other words, the design of the coupling device may hereby avoid an undesired turbulence of the fluid during operation of the coupling device.

According to the present invention, the antimicrobial coating may be configured to provide an antimicrobial effect upon contact with the fluid. The present embodiment is advantageous in that the antimicrobial effect, meaning a killing of the microbes, is conveniently initiated by the antimicrobial's contact with the fluid.

According to an embodiment of the present invention, the antimicrobial coating may comprise synthetic antimicrobial peptides. The present embodiment is advantageous in that the antimicrobial effect is particularly efficient by the provision of the (synthetic) antimicrobial peptides. It should be noted that antimicrobial peptides have a broad spectrum of activity and are effective against drug-resistant pathogens. More specifically, by the features of the coupling device, fluid coming into contact with the antimicrobial coating may lead to a release of peptides from the surface(s) of the first and/or second sealing element(s), bringing together the microbes and the peptides. This makes it possible for the peptides to rip up the microbe's membrane, instantly killing the microbe.

According to an embodiment of the present invention, at least one of the first and second sealing elements may comprise a guiding hole extending along the principal axis, A, wherein the guiding hole is arranged to guide the tube through the at least one of the first and second sealing elements. It will be appreciated that the first and/or second sealing elements may retain their excellent sealing properties even if provided with a guiding hole, as the diameter of the guiding hole is (very) small, and that the fluid therefore cannot pass through the guiding hole. The present embodiment is advantageous in that the guiding hole may prevent and/or mitigate wear on the first and/or second sealing elements during projection and/or retraction of the tube into and/or out of, respectively, the first and/or second sealing elements. In other words, the guiding hole may minimize and/or prevent a tearing of the sealing element material, such that an undesired wear of the sealing element(s) and/or a contamination of the fluid in the flow of fluid through the coupling device may be avoided.

According to an embodiment of the present invention, at least one of the first and second sealing elements may comprise a resilient membrane, wherein the at least one resilient membrane may have a convex shape and is configured to flatten upon abutment of the first sealing element with the second sealing element. It will be appreciated that the resilient membrane(s) is (are) configured to become arranged (clamped) between the first and second sealing elements upon connection of the second and third housings. In case each of the first and second sealing elements comprises a resilient, convex-shaped membrane, it will be appreciated that the membranes may push away air and form an air-tight seal, furthermore minimizing dead space, when the membranes are pressed against each other. The embodiment is advantageous in that the sealing element(s) may provide an efficient sealing between the second and third housings via the resilient membrane(s) when the second and third housings are connected, such that any leakage between the second and third housings can be avoided. Hence, the present embodiment may even further improve the sealing properties of the coupling device. According to an example, the resilient membrane may comprise silicone. Silicone is particularly suitable for sealing purposes, thereby even further improving the sealing of the coupling device. Furthermore, the use of silicone of the membrane is advantageous in that the tube may penetrate the membrane without (or at least minimizing a) tearing of the material, such that an undesired wear of the membrane and/or a contamination of the fluid in the flow of fluid through the coupling device may be avoided.

According to an embodiment of the present invention, the coupling device may further comprise at least one third housing displaceably arranged within the first housing along the principal axis, A, between a first position at the front end portion of the first housing and a second position at the back end portion of the first housing, wherein the third housing encloses the first sealing element. By the term "displaceably arranged", it is here meant that the third housing may be arranged or mounted within the first housing in such a way that it is displaceable or moveable within the first housing.

According to an embodiment of the present invention, the second housing may be insertable between the first housing and the first sealing element.

According to an embodiment of the present invention, the coupling device may further comprise a locking arrangement. In the second position, the third housing is releasably connected to the first housing via the locking arrangement. In other words, when the third housing is in its second, retracted position in the first housing, the third housing may be releasably connected to the first housing. It will be appreciated that this position of the third housing implies an enabled transfer of fluid through the coupling device, and the present embodiment is advantageous in that a fluid may be transferred through the device in a stationary state of the coupling device, i.e. without the need of applying any pressure on one or more components of the coupling device.

According to an embodiment of the present invention, whereby in case of a force, F, applied on the second housing connected to the third housing in the second position along the principal axis, A, towards the first position exceeds a predetermined threshold, the third housing is configured to be released from a connection to the first housing in the second position, the third housing is configured to be displaced from the second position into the first position, and the second housing is configured to be released from the connection to the third housing. Hence, in case of a (pulling) force applied on the second housing (or between the second housing and the third housing) exceeds a predetermined threshold, the second housing is configured to detach (disconnect) from the third housing according to the disclosed arrangement. The present embodiment is advantageous in that the second housing and the third housing of the coupling device are only configured to detach in case the coupling device is subjected to a pulling force applied to the second housing which exceeds a predetermined threshold value, such that the transfer of fluid through the coupling device is interrupted. In other words, the second and third housings are only configured to separate from each other when exposed to a pulling force which is relatively strong. Hence, the second and third housings of the coupling device are configured to stay connected in case the coupling device is subjected to a relatively weak force which does not exceed the predetermined threshold value, such that the coupling device may remain operative for transferring a fluid.

In case there is provided a tube for medical purposes equipped with a coupling device of the present invention, it will be appreciated that the coupling device is further advantageous in that the coupling device may be detached before any relatively large force, subjected to a portion of the tube on one side of the coupling device, is transferred to the other portion of the tube, on the other side of the coupling device. For example, if an element is connected to the tube, the coupling device may mitigate any pull, jerk, twitch or the like, of the element.

The coupling device of the present invention is further advantageous in that consequences related to medical staff and/or patients tripping and/or falling over tubes comprising one or more coupling devices may be mitigated.

The embodiment is advantageous in that the threshold of the force, F, can be conveniently set or determined according to the purpose of the coupling device. For example, in case a coupling device is used when a needle is inserted into a patient, the threshold of the force, F, can be determined to be relatively low. In contrast, in case a coupling device is used when a urinary catheter is used, the threshold of the force, F, can be determined to be relatively high.

According to an embodiment of the present invention, the coupling device may comprise a locking mechanism for releasable connection of the second housing to the third housing. The embodiment is advantageous in that the second housing may be conveniently connected to (or disconnected from) the third housing by means of the locking element(s).

According to an example of the present invention, in the second position of the third housing, the second housing and the third housing may be connected by the locking mechanism. Hence, in the second, retracted position of the third housing, when the tube projects through the first and second sealing elements and into the passage for enabling a transfer of fluid through the coupling device, the locking mechanism connects the third and second housings to each other. The embodiment is advantageous in that the locking mechanism may provide a reliable connection of the third and second housings to each other, such that the third and second housings provide a sealed (leak-proof) transfer of fluid through the coupling device.

According to an example of the present invention, the second housing may comprise a first locking element of the locking mechanism, and the third housing may comprise a second locking element of the locking mechanism, wherein the first and second locking elements are configured to releasably lock upon rotation of the first and second locking elements with respect to each other. For example, the locking mechanism for connecting the third and second housings according to the present or to any previously disclosed embodiment may comprise a connection of a male-female type. It will be appreciated that the locking mechanism of a male-female type may comprise at least one groove and at least one projection configured to project into the at least one groove.

According to an embodiment of the present invention, during a displacement of the third housing and second housing from the first position to the second position, the second locking element is configured to rotate with respect to the first locking element for mating engagement with the first locking element such that the second housing and the third housing are connected in the second position, and during a displacement of the third housing and second housing from the second position to the first position, the second locking element is configured to rotate with respect to the first locking element for disengaging the mating engagement such that the second housing and the third housing are disconnected in the first, extracted position. In other words, when the third and second housings are pushed into the first housing of the coupling device from the first to the second position, the third and second housings connect via a rotation of the first and second locking elements with respect to each other. Analogously, when the third and second housings are pulled out of the first housing of the coupling device from the second to the first position, the third and second housings disconnect via a rotation of the first and second locking elements with respect to each other.

According to an example of the present invention, at least one of the first and second sealing elements may comprise a resilient membrane, wherein the at least one resilient membrane comprises a guiding hole, and wherein the at least one resilient membrane is configured to be arranged into a respective fitting of the first and/or second sealing element, the size of the at least one resilient membrane being larger than the fitting such that the guiding hole is configured to be compressed upon arrangement of the at least one resilient membrane into the fitting. The example is advantageous in that the tube may be guided by the compressed guiding hole upon projection of the tube through the sealing elements. The example is further advantageous in that the compressed guiding hole may avoid, or at least minimize, a tearing of the membrane material upon penetration of the tube through the sealing elements.

According to an example of the present invention, the coupling device may further comprise an alarm arrangement configured to generate an alarm in case the coupling device is disconnected. For example, the alarm arrangement may be configured to generate an alarm in case the third housing and the second housing are disconnected. The present example is advantageous in that the alarm arrangement may quickly and efficiently alert a patient, medical staff and/or other persons that the coupling device has been disconnected or detached, and that the fluid transportation through the coupling device (and, in case the coupling device is provided to a medical tube, also through the medical tube) has been interrupted.

According to an example of the present invention, the alarm may comprise at least one of a visual alarm and an audible alarm. The present example is especially advantageous when considering that patients often may suffer from impaired eyesight and/or impaired hearing. The present example is further advantageous in that the alarm may alert medical staff which is not present in the same room as the patient.

According to an example of the present invention, the coupling device may be configured to generate a tactile feedback to an operator when the second housing is in the second position. By the term "tactile feedback", it is here meant a physical sensation, alert, or the like, which can be felt by an operator upon handling of the coupling device. For example, the coupling device may be configured to generate a tactile feedback to an operator when the coupling device is connected, e.g. when the third housing, in its second position, becomes connected to the first housing. The present embodiment is advantageous in that an operator may be assured that the coupling device is correctly coupled or connected, e.g. when the third housing is in the second, retracted position, as the coupling device hereby is configured to enable a transfer of fluid through the coupling device.

According to an embodiment of the present invention, there is provided a medical tube for transferring a fluid to or from a patient, wherein the medical tube comprises at least one coupling device according to any one of the preceding embodiments. In other words, the medical tube may comprise a first tube portion and a second tube portion, wherein a coupling device may be arranged between the first and second tube portions. By the term "medical tube" it is here meant substantially any tube for medical purposes, e.g. an infusion tube or urinary catheter. The present embodiment is advantageous in that the medical tube may be conveniently disconnected or detached via the coupling device. For example, a pulling of the medical tube, e.g. by a patient and/or medical staff, may detach the third housing from the second housing of the coupling device, thereby mitigating any further pulling of the tube at the other end thereof. Hence, the medical tube may comprise a "weak link" by means of the coupling device, which is particularly advantageous for medical tubes used at hospitals, nursing homes, clinics, etc. Furthermore, the medical tube comprising the coupling device may provide an increased patient and/or medical staff safety, as the antimicrobial coating of the coupling device provides antimicrobial properties.

According to an embodiment of the present invention, there is provided a medical kit comprising at least one medical tube according to the previous embodiment. The at least one medical tube comprises at least one coupling arrangement provided at at least one end thereof, and at least one element connected to the medical tube via the at least one coupling arrangement. It will be appreciated that the coupling arrangement may be of substantially any type, e.g. a standardized coupling which may be possible to couple to many different kinds of elements. For example, the (medical) element(s) may be an element arranged for insertion into a patient and configured to transfer a fluid into, or out from, a patient, such as a needle, cannula, catheter, trocar, or the like. Alternatively, or in addition, the element(s) may be at least one container arranged to supply a fluid to/from a patient via the medical tube. The present embodiment is advantageous in that the medical kit may increase the safety during a medical process, e.g. an infusion process. More specifically, the medical kit may conveniently mitigate effects of a medical tube exposed to forces, e.g. by a pulling of the medical tube by the patient and/or medical staff, and in particular when the medical tube is connected to an element for transferring a fluid to and/or from a patient.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

FIGS. 2a-d are schematic, cross-sectional views of a coupling device according to an exemplifying embodiment of the present invention, FIGS. 4a-c are schematic, cross-sectional views of portions of a coupling device according to exemplifying embodiments of the second aspect of the present invention, FIGS. 5a and 5b schematically shows locking and unlocking operations of a coupling device according to exemplifying embodiments of the present invention, FIG. 6 schematically shows a disconnection of the coupling device.

DETAILED DESCRIPTION

Figure 1A:
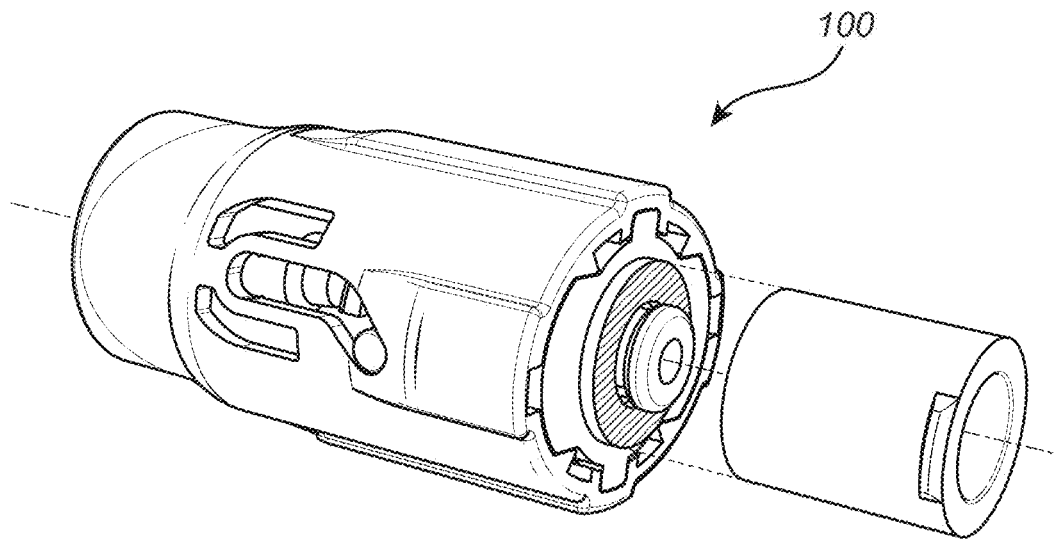
FIGS. 1a-b are schematic views of a coupling device according to an exemplifying embodiment of the present invention.
Figure 1B:
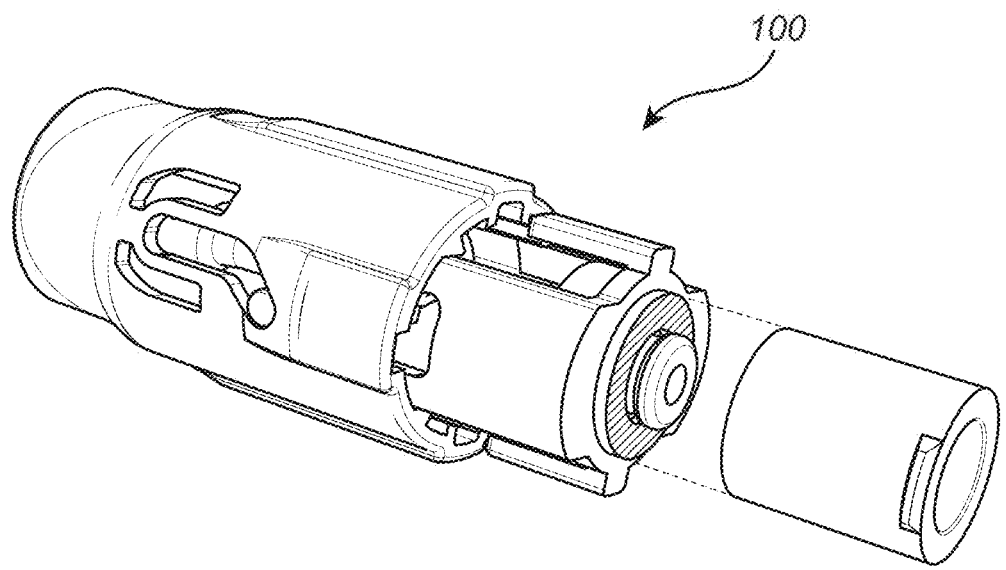

FIGS. 1a-b are schematic views of a coupling device 100 according to an exemplifying embodiment of the present invention. It will be appreciated that FIGS. 1a-b are provided for an initial description of the coupling device 100, and that a more detailed description of the properties and operation of the coupling device 100 is provided in the following figures and associated text.

The coupling device 100 is provided for the transfer of a fluid through the coupling device 100 when the coupling device 100 is in its connected state. In FIG. 1a, a connection of the coupling device 100 has been initiated, which will be described in more detail in the following text and associated figures. In FIG. 1b, a disconnection of the coupling device 100 has been initiated. Eventually, the coupling device 100 becomes disconnected (detached), whereby the transfer of fluid through the coupling device 100 is interrupted.

FIGS. 2a-d are schematic, cross-sectional views of a coupling device 100 according to an exemplifying embodiment of the present invention. It will be appreciated that the four FIGS. 2a-d disclose exemplifying and momentary positions of a connection of a coupling device 100 for an increased understanding of the operation of the coupling device 100. A disconnection of the coupling device 100 is presented in FIGS. 3a and 3b as well as in FIGS. 4a-c.

Figure 2A:
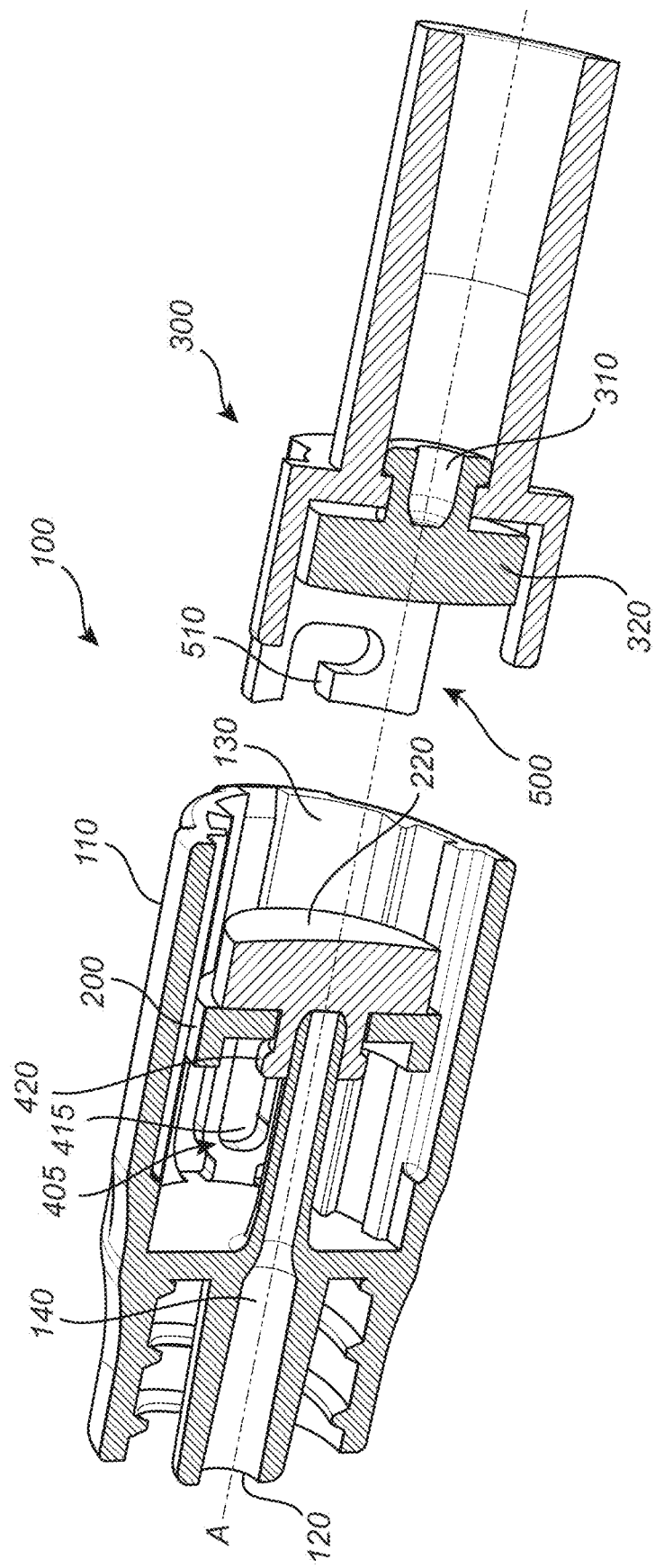

FIG. 2a is a schematic view of a coupling device 100 for transferring a fluid, wherein the coupling device 100 is shown in a disconnected state. The coupling device 100 comprises a cylinder-shaped first housing 110 with an elliptic cross-section, wherein the first housing 110 extends along a principal axis A. The first housing 110 comprises a first opening 120 at a central portion of the back end portion (e.g. a bottom part) of the first housing 110, and a second opening 130 at the front end portion of the first housing 110. The coupling device 100 further comprises a tube 140 which extends from the first opening 120 of the first housing 110 into the interior of the first housing 110 along the principal axis, A. The end of the tube 140 which points towards the interior of the first housing 110 may be formed to be sharp or pointed, and the end of the tube 140 exemplified in FIG. 2a is beveled. However, the end of the tube 140 may alternatively be straight, i.e. without any sharp or pointed end.

According to an example, the coupling device 100 may further comprise a third housing 200 which is enclosed by the first housing 110 and is displaceably arranged within the first housing 110 along the principal axis, A. It will be appreciated that the third housing 200 may be fittingly arranged within the first housing 110, e.g. by means of grooves or the like. In FIG. 2a, the third housing 200 is positioned in a first (extracted) position within the first housing 110. For example, the first, extracted position may constitute a position towards (or at) the front end portion of the first housing 110. The coupling device 100 comprises a first sealing element 220, wherein the first sealing element 220 according to the example of FIG. 2a is enclosed by and/or arranged in the first housing and/or third housing 200. The first sealing element 220 is exemplified as a cushion or pad-like element arranged at an end of the tube 140 of the first housing 110.

The coupling device 100 further comprises a second housing 300 which in the disconnected state of the coupling device 100 is separated from the first housing 110 (and according to examples, also from the third housing 200) of the coupling device 100. The second housing 300 comprises a channel 310 which is arranged through the second housing 300. The third housing 200 further comprises a second sealing element 320 which is arranged to seal the second channel 310.

It will be appreciated that in the disconnected state of the coupling device 100 as shown in FIG. 1a, there can be no passage of fluid through the coupling device 100. More specifically, the first sealing element 220 seals the tube 140 such that there is no passage of fluid through the third housing 200 or first housing 110. Analogously, the second sealing element 320 seals the second channel 310 such that there is no passage of fluid through the second housing 300.

The first sealing element 220 and/or the second sealing element 320 may comprise, or consist of, a respective resilient membrane 600 for sealing purposes. The membrane 600 may comprise or consist of substantially any material which is suitable for sealing purposes, e.g. silicone. Furthermore, the first sealing element 220 and/or second sealing element 320 may have a convex shape. According to an alternative embodiment, the resilient membrane(s) 600 may comprise a guiding hole, i.e. a through hole for guiding the tube 140, and the resilient membrane(s) 600 may be configured to be arranged into (a) fitting(s) of the first 220 and/or second 320 sealing element (not shown). The size of the resilient membrane(s) 600 may hereby be larger than the fitting(s) such that the guiding hole(s) is (are) configured to be compressed upon arrangement of the resilient membrane(s) 600 into the fitting.

The second housing 300 is insertable into the first housing 110 via the second opening 130 of the first housing 110. Hence, the first housing 110 is able to receive the second housing 300 via the second opening 130 thereof and accommodate the second housing 300 within the first housing 110. The first housing 110 and the second housing 300 may have elliptic cross-sections, whereas the third housing 200 may have a circular cross-section. It will be appreciated that the provision of elliptic cross-sections may facilitate the coupling between the housings. For example, the second housing 300 may be connected to the third housing 200 by a relative arrangement of 0° or 180° between the second housing 300 and the third housing 200.

In the exemplifying embodiment of the coupling device 100 in FIG. 2a, the coupling device 100 comprises a locking mechanism 500 for releasable connection of the second housing 300 to the third housing 200. The second housing 300 comprises a first locking element 510 of the locking mechanism 500, wherein the first locking element 510 has the form of one or more hooks projecting from the second housing 300. The third housing 200 comprises a second locking element (not shown) of the locking mechanism 500 for locking engagement with the first locking element 510 of the locking mechanism 500.

The coupling device 100 further comprises a locking arrangement 405 for releasably locking and/or connecting the third housing 200 to the first housing 110. The locking arrangement 405 comprises at least one groove 415 in the first housing 110 into which a locking element of the third housing 200 is configured to matingly engage (shown in FIG. 3a). The locking arrangement 405 of the coupling device 100 may be configured to generate a tactile feedback to an operator when the second housing 300 is in the second position. For example, the locking arrangement 405 may be configured to generate a snap and/or click sensation upon locking, such that an operator may be informed or made aware that the third housing 200 is connected to the first housing 110 in the second position.

Figure 2B:
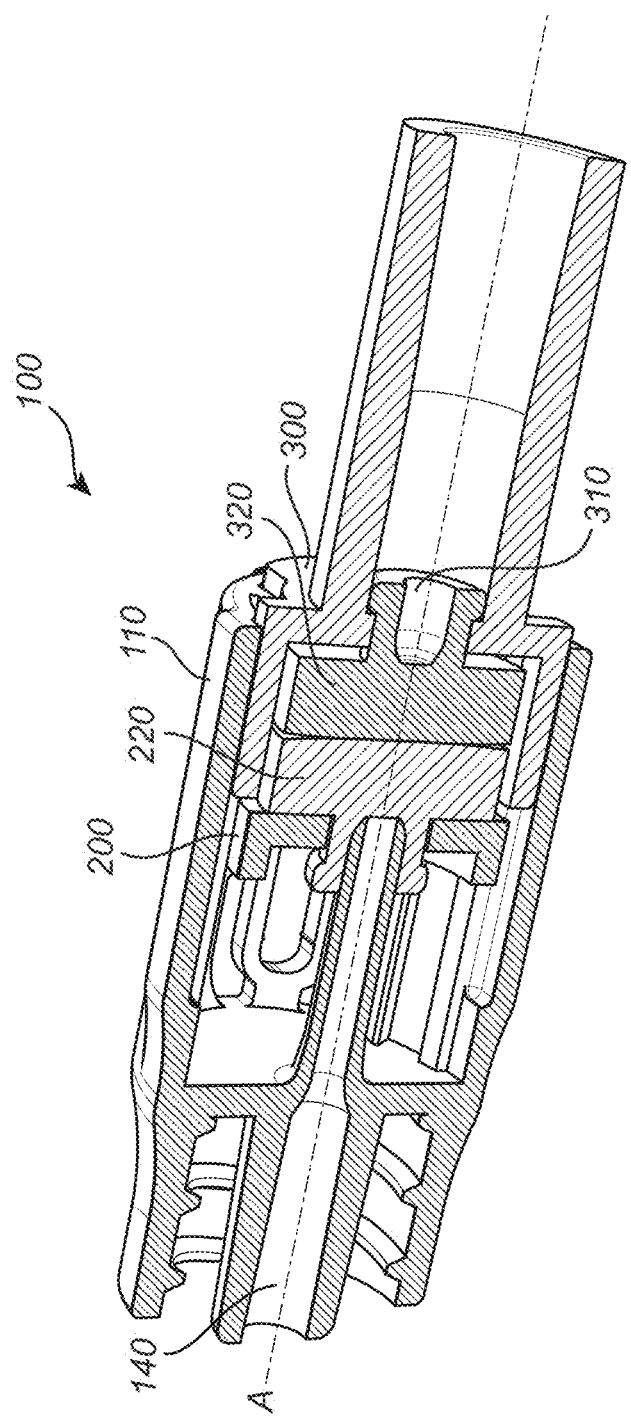

FIG. 2b is a schematic view of a coupling device 100 for transferring a fluid, wherein the second housing 300 has been inserted in the first housing 110 via its second opening 130 and along the principal axis A, as compared to FIG. 2a. Furthermore, in this state or position of the coupling device 100, the first sealing element 220 of the first housing 110 and/or third housing 200 and the second sealing element 320 of the second housing 300 abut. Here, both the first sealing element 220 and the second sealing element 320 comprise resilient membranes 600 of convex shape, such that the central portions of the respective elements are initially configured to come into contact upon insertion of the second housing 300 into the first housing 110. In this embodiment, the convex-shaped membranes of the first and second sealing elements 220, 320 are configured to flatten upon abutment of the first sealing element 220 with the second sealing element 320. In this manner, the first and second sealing elements 230, 320 may sealingly separate the tube 140 of the first housing 110 and the channel 310 of the second housing 300.

FIG. 2c is a schematic view of a coupling device 100 for transferring a fluid, wherein the third housing 200 and the second housing 300 are being displaced within the first housing 110. In this depicted current state of the coupling device 100, the convex-shaped membranes of the first and second sealing elements 220, 320 have flattened as a consequence of the force between the first sealing element 220 with the second sealing element 330, and the original shapes of the convex membranes are schematically indicated. During the movement of the third housing 200 (and the second housing 300) from the first, extracted position to the second, retracted position of the second housing, the tube 140 of the first housing 110 gradually projects through the first sealing element 220 and the second sealing element 320 for connection with the channel 310 for enabling a transfer of fluid through the coupling device 100. Furthermore, during this movement, the second housing 300 and the third housing 200 are configured to engagingly and releasably lock via the locking mechanism upon rotation of the first locking element and the second locking element with respect to each other.

Figure 2D:
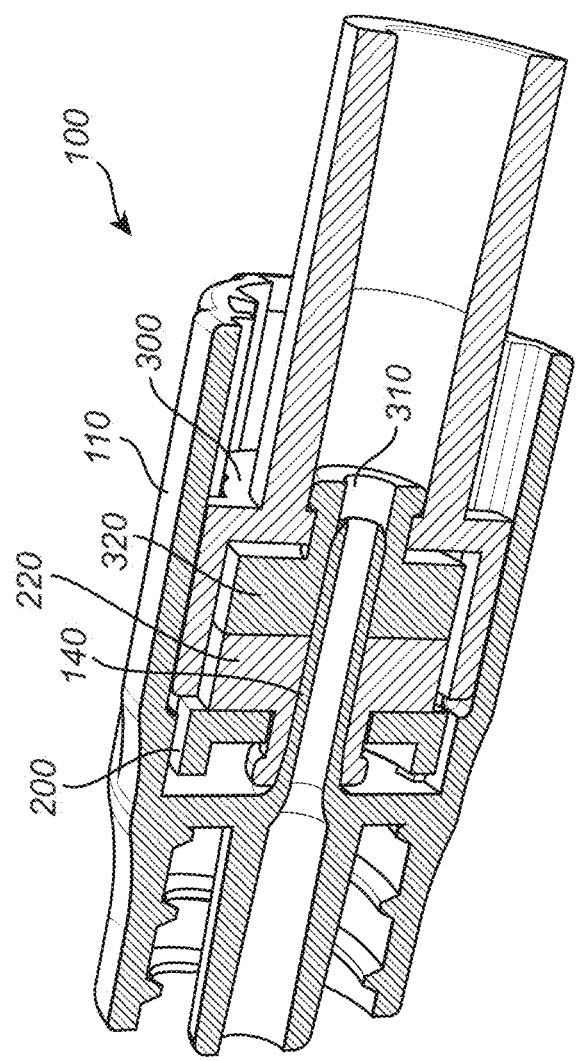

FIG. 2d is a schematic view of a coupling device 100 for transferring a fluid, wherein the third housing 200 is positioned in the second position in the first housing 110, and the second housing 300 is connected to the third housing 200. In this position, the second housing 300 and the third housing 200 are connected by means of the locking mechanism (not shown). The tube 140 projects or penetrates through the first sealing element 220 and the second sealing element 320. Furthermore, the tube 140 becomes fittingly inserted and debouches into the channel 310 of the second housing 300. In this configuration of the coupling device 100, a transfer of fluid through the coupling device 100 is enabled.

Figure 3A:
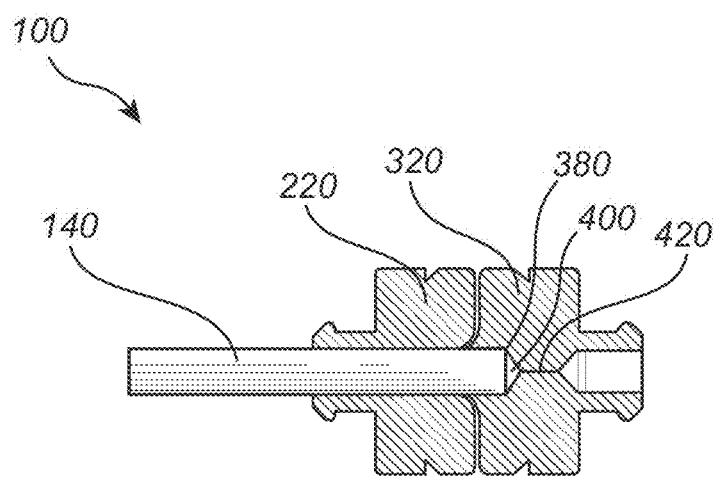
FIGS. 3a and 3b are schematic, cross-sectional views of portions of a coupling device according to exemplifying embodiments of the first aspect of the present invention.
Figure 3B:
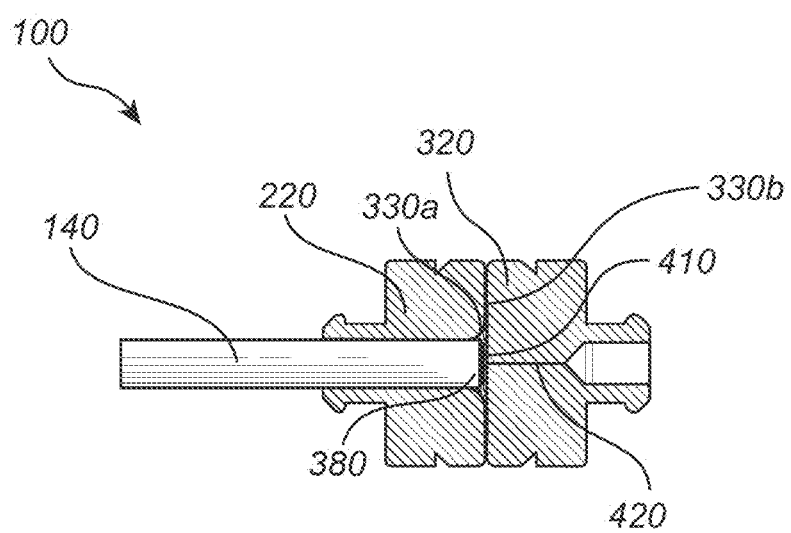

FIGS. 3a and 3b are schematic, cross-sectional views of portions of a coupling device 100 according to exemplifying embodiments of a first aspect of the present invention. It should be noted that features and/or references of the coupling device 100 with respect to the coupling device 100 as described by FIGS. 2a-d have been removed for simplicity, and it is referred to FIGS. 2a-d for an increased understanding of the operation of the coupling device 100. It will be appreciated that the two FIGS. 3a and 3b disclose exemplifying and momentary stages of a disconnection of a coupling device 100 for an increased understanding of the operation of the coupling device 100.

FIG. 3a is a schematic, cross-sectional view of a portion of a coupling device 100 at a first stage of a disconnection of the coupling device 100 according to the first aspect of the present invention. Upon this first stage of the disconnection of the coupling device 100, which disconnection may be triggered by a pulling force applied to the coupling device 100, the tube 140 is retracted through the first and second sealing elements 220, 320. Hence, the tube 140, which in FIG. 2d was in fluid contact with the channel 310 for a transfer of fluid through the coupling device 100 in the second stage of the connection of the coupling device 100, has been retracted such that an end portion 380 of the tube 140 is enclosed by the second sealing element 320. The coupling device 100 comprises a guiding hole 420 in the first and/or second sealing elements 220, 320, wherein the guiding hole 420 is arranged to guide the tube through the first and/or second sealing elements 220, 320. At this first stage, the tube 140 and the second sealing element 320 are configured to define a first space 400 at the end portion 380 of the tube 140. In FIG. 3a, the first space 400 is exemplified as a cone-shaped volume defined by the (end portion 380 of the) tube 140 and the second sealing element 320. It will be appreciated that the volume and/or shape of the first space 400 may be dependent on one or more properties of the second sealing element 320 and/or the tube 140, e.g. the material of the second sealing element 320, the material and/or shape of the tube 140, etc. For example, the volume and/or shape of the first space 400 may be dependent on the friction between the second sealing element 320 and the tube 140. In FIG. 3a, the first space 400 it at least partially filled with the fluid which the coupling device 100 is arranged to transfer when the coupling device 100 is in a connected state. In other words, a portion of the fluid which the coupling device 100 is arranged to transfer in a connected state, is present in the first space 400 in the first stage of the disconnection of the coupling device 100, and at least partially fills the first space 400.

FIG. 3b is a schematic, cross-sectional view of a portion of a coupling device 100 at a second stage of a disconnection of the coupling device 100 according to the first aspect of the present invention. At this second stage of the disconnection of the coupling device 100, compared to the first stage shown in FIG. 3a, the tube 140 is retracted through the first sealing element 220. Compared to FIG. 3a, the tube 140 in FIG. 3b has been retracted through the second sealing element 320 such that the end portion 380 of the tube 140 is in close vicinity of the (face of the) second sealing element 320. The tube 140, the first sealing element 220 and the second sealing element 320 are configured to define a second space 410 at the end portion 380 of the tube 140. It will be appreciated that the volume and/or shape of the second space 410 may be dependent on one or more properties of the first sealing element 220 and/or the tube 140, e.g. the material of the first sealing element 220, the material and/or shape of the tube 140, etc. For example, the volume and/or shape of the second space 410 may be dependent on the friction between the first sealing element 220 and the tube 140. The first space 400 as defined by the tube 140 and the second sealing element 320 in FIG. 3a has collapsed upon the retraction of the tube 140 in FIG. 3b. Hence, in FIG. 3b, the second sealing element 320 has retained its unbiased, original state and the fluid which was present in the first space 400 in FIG. 3a has entered (has been released into) the second space 410.

The first sealing element 220 and/or the second sealing element 320 may comprise an antimicrobial coating 330a, 330b, respectively. The antimicrobial coating 330a, 330b is arranged or configured to provide or achieve an antimicrobial effect upon contact with the fluid. For example, the antimicrobial coating 330a, 330b may comprise synthetic antimicrobial peptides. By the features of the coupling device 100, fluid coming into contact with the antimicrobial coating 330a, 330b may lead to a release of peptides from the surface(s) of the first and/or second sealing element(s) 220, 320, bringing together the microbes and the peptides. This makes it possible for the peptides to rip up the microbe's membrane, instantly killing the microbe.

It will be appreciated that antimicrobial peptides have a broad spectrum of activity and are effective against drug-resistant pathogens. One fragment of such a host-defense peptide, lactoferrin (present in breast milk), is called lactoferricin. By extensive structure activity relationship investigations, its antibacterial pharmacophore property has been harnessed into a small molecule, AMC-109, which may constitute the antimicrobial peptide according to an embodiment of the present invention. The AMC-109 may retain and amplify the antimicrobial properties characteristic of the natural peptides while gaining the properties required of an industrially applicable product such as extended stability against metabolic degradation and ease of manufacture. The AMC-109 is active against a wide range of bacteria and fungi, such as *Staphylococcus*, MRSA, Streptococci, Enterococci, *Corynebacterium, Pseudomonas, Escherichia coli, Enterobacter*, Coagulase neg., *S. aureus, H. influenzae, Candida*, etc.

In the second stage of the disconnection of the coupling device 100 according to FIG. 3b, the fluid which has been released from the first space 400 and has entered the second space 410 comes into contact with at least a portion of the antimicrobial coating 330a of the first sealing element 220 and/or at least a portion of the antimicrobial coating 330b of the second sealing element 320.

FIGS. 4a-c are schematic, cross-sectional views of portions of a coupling device 100 according to exemplifying embodiments of the second aspect of the present invention. It should be noted that features and/or references of the coupling device 100 with respect to the coupling device 100 as described by FIGS. 2a-d have been removed for simplicity, and it is referred to FIGS. 2a-d for an increased understanding of the operation of the coupling device 100. It will be appreciated that FIGS. 4a-c disclose exemplifying and momentary stages of a connection and disconnection of a coupling device 100 for an increased understanding of the operation of the coupling device 100 according to the second aspect of the present invention.

FIG. 4a schematically discloses the sealing elements 220, 320 of a portion of the coupling device 100 according to the second aspect of the present invention. The coupling device 100 is in its disconnected state, and thereby corresponds to the state of the coupling device 100 as shown in FIG. 2a. The coupling device 100 comprises a guiding hole 420 in the first and second sealing elements 220, 320, wherein the guiding hole 420 is arranged to guide the tube (not shown in FIG. 4a for an increased view/understanding) through the first and/or second sealing elements 220, 320. The first sealing element 220 and/or the second sealing element 320 comprises an antimicrobial coating 330. The antimicrobial coating 330 is arranged on the front side 395a of the first sealing element 220 and/or on the front side 395b of the second sealing element 320. The first sealing element 220 further comprises a cavity 390a on its front side 395a, and the second sealing element 320 further comprises a cavity 390b on its front side 395b. According to this example, the cavities 390a, 390b are (mirror) symmetric, but other forms of the cavities 390a, 390b are also possible. At a first stage of a connection (not shown) of the coupling device 100 according to this second aspect of the present invention, the first and second sealing elements 220, 320 are hereby configured to abut each other, wherein the cavity 390a of the first sealing element 220 and/or the cavity 390b of the second sealing element 320 define a first space upon contact between the first and second sealing elements.

FIG. 4b is a schematic, cross-sectional view of a portion of a coupling device 100 at a first stage of a disconnection of the coupling device 100 according to the second aspect of the present invention. Upon this first stage of the disconnection of the coupling device 100, which disconnection may be triggered by a pulling force applied to the coupling device 100, the tube 140 is retracted through the first and second sealing elements 220, 320. Hence, the tube 140, which in FIG. 2d was in fluid contact with the channel 310 for a transfer of fluid through the coupling device 100 in the second stage of the connection of the coupling device 100, has been retracted such that an end portion 380 of the tube 140 is enclosed by the second sealing element 320. At this first stage, the tube 140 and the second sealing element 320 are configured to define a second space 410 at the end portion 380 of the tube 140. In FIG. 4b, the second space 410 is exemplified as a cone-shaped volume defined by the (end portion 380 of the) tube 140 and the second sealing element 320. It will be appreciated that the volume and/or shape of the second space 410 400 may be dependent on one or more properties of the second sealing element 320 and/or the tube 140, e.g. the material of the second sealing element 320, the material and/or shape of the tube 140, etc. In FIG. 4b, the second space 410 is at least partially filled with the fluid. In other words, a portion of the fluid which the coupling device 100 is arranged to transfer is present in the second space 410, and at least partially fills the second space 410.

FIG. 4c is a schematic, cross-sectional view of a portion of a coupling device 100 at a second stage of a disconnection of the coupling device 100 according to the second aspect of the present invention. At this second stage of the disconnection of the coupling device 100, the tube 140 is retracted through the first sealing element 220. Compared to FIG. 4b, the tube 140 in FIG. 4c has been retracted through the second sealing element 320 such that the end portion 380 of the tube 140 is in close vicinity of the (face of the) second sealing element 320. The second space 410 as defined by the tube 140 and the second sealing element 320 in FIG. 4b has collapsed upon the retraction of the tube 140 in FIG. 4c. Hence, in FIG. 4c, the second sealing element 320 has retained its unbiased, original state and the fluid which was present in the second space 410 in FIG. 4b has entered (has been released into) the first space 400 defined by the cavities 390a, 390b on the front sides 395a, 395b of the first and second sealing elements 220, 320, respectively.

The first sealing element 220 and/or the second sealing element 320 may comprise an antimicrobial coating 330a, 330b, respectively. The antimicrobial coating 330a, 330b is arranged or configured to provide or achieve an antimicrobial effect upon contact with the fluid. For example, the antimicrobial coating 330a, 330b may comprise synthetic antimicrobial peptides. In the second stage of the disconnection of the coupling device 100 according to the second aspect of the present invention as exemplified in FIG. 4c, the fluid which has been released from the second space 410 and has entered the first space 400 comes into contact with at least a portion of the antimicrobial coating 330a of the first sealing element 220 and/or at least a portion of the antimicrobial coating 330b of the second sealing element 320.

Figure 5A:
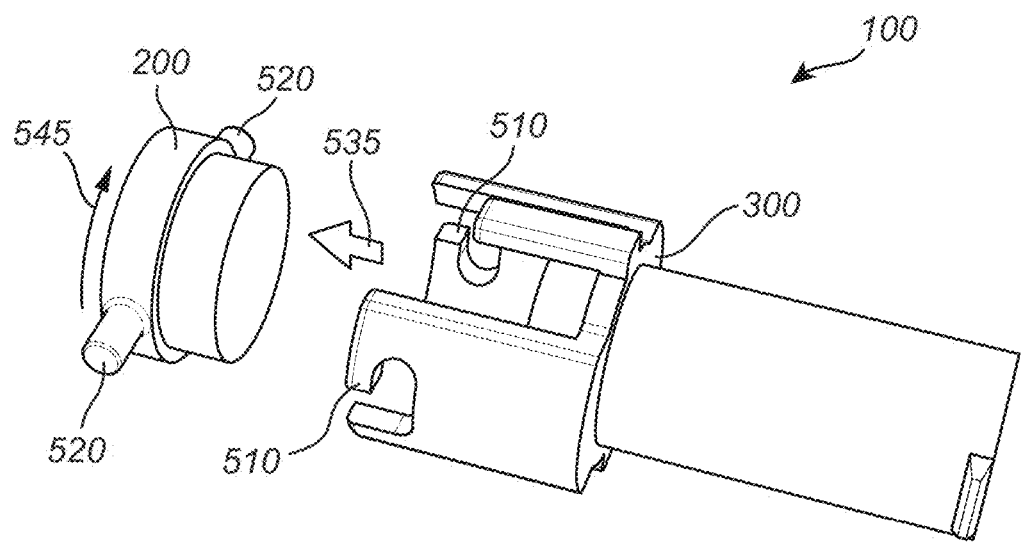

FIG. 5a schematically shows a simplified view of a portion of the coupling device 100 as previously described. Here, the third housing 200 and the second housing 300 have been extracted from the coupling device 100 for reasons of understanding of the locking operation of the third housing 200 and the second housing 300. The locking mechanism in FIG. 5a comprises a first locking element 510 of the second housing 300, wherein the first locking element 510 comprises two projecting portions each comprising a groove. The locking mechanism in FIG. 5a further comprises a second locking element 520 of the third housing 200, wherein the second locking element 520 comprises two projections. Upon movement of the second housing 300 towards the third housing 200, as indicated by arrow 535, the second locking element 520 is configured to rotate, as indicated by arrow 545, as the result of the second locking element 520 being guided by a groove in the first housing (not shown). The second locking element 520 is hereby rotated with respect to the first locking element 510 for mating engagement with the first locking element 510 such that the second housing 300 and the third housing 200 become connected in the second position of the second housing 300. It will be appreciated that the third housing 200, in the second position, is releasably connected to the first housing 110 via the at least one groove 415 (see FIG. 2a) and the second locking element 520.

Figure 5B:
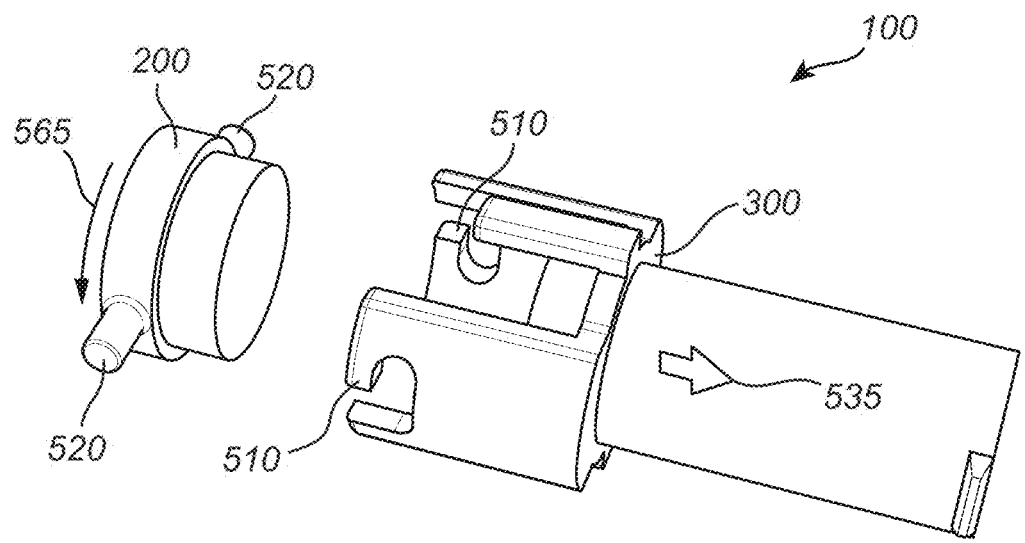

Analogously, FIG. 5b schematically shows a simplified view of a portion of the coupling device 100 as previously described, and furthermore shows an unlocking operation of the third housing 200 and the second housing 300 of the coupling device 100 in a schematic manner. During a displacement of the third housing 200 and the second housing 300 from the second, retracted position to the first, extracted position, as indicated by arrow 555, the second locking element 520 is configured to rotate, as indicated by arrow 565, with respect to the first locking element 510. As a result, the second locking element 520 disengages the mating engagement with the second housing 300. The second locking element 520 is hereby rotated with respect to the first locking element 510 such that the second housing 300 and the third housing 200 become disconnected in the first position of the third housing 200.

Figure 6:
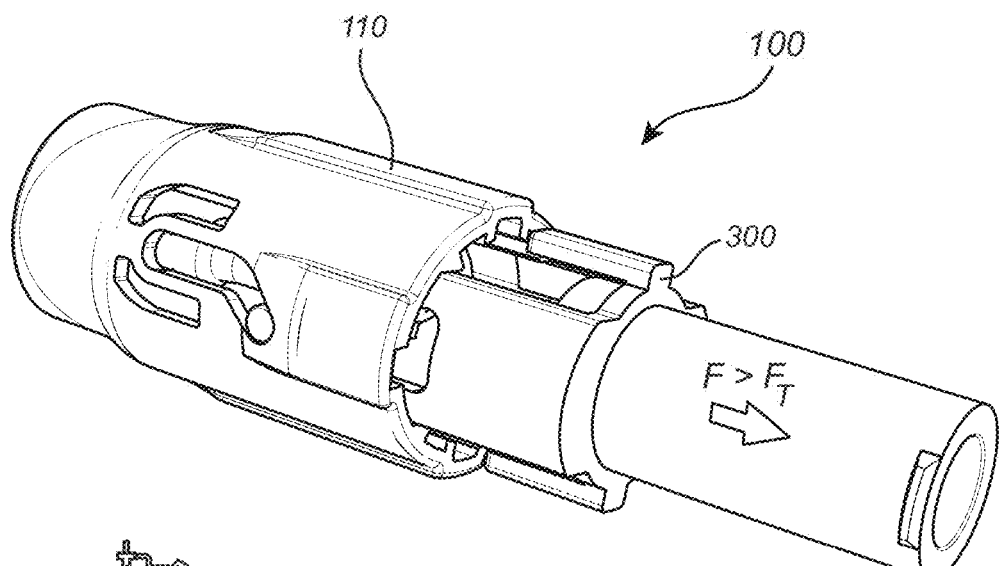

FIG. 6 schematically shows a disconnection of the coupling device 100 in case of a force, F, applied on the second housing 300 along the principal axis, A, exceeds a predetermined threshold, FT. In this case, the third housing (not shown) is configured to be released from a connection to the first housing 110 when the third housing is in its second, retracted position. Thereafter, the third housing and the second housing 300 are configured to be displaced from the second position into the first position, and the second housing 300 is configured to be released from its connection to the third housing. Eventually, the coupling device 100 becomes disconnected (detached), whereby the transfer of fluid through the coupling device 100 is interrupted.

It will be appreciated that the coupling device 100 furthermore may comprise an alarm arrangement (not shown). The alarm arrangement may be configured to generate an alarm in case the coupling device 100 is disconnected. The alarm may for example comprise a visual alarm and/or an audible alarm. Furthermore, the alarm may be coupled (wirelessly or by wire) to any other equipment used by the medical staff for monitoring the patient(s).

Figure 7:
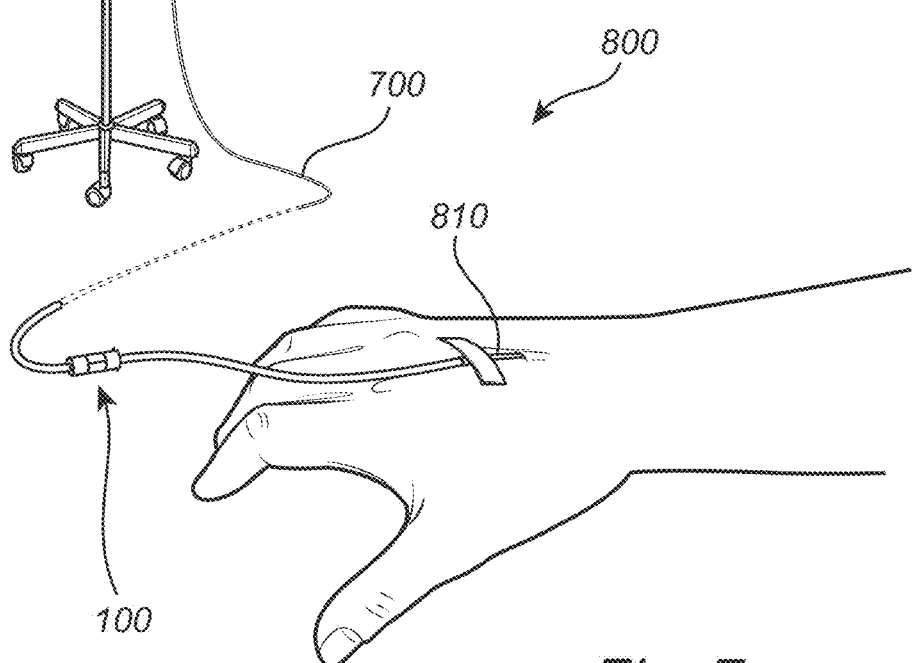
FIG. 7 shows a schematic view of a medical kit according to an embodiment of the present invention.

FIG. 7 shows a medical kit 800 according to an embodiment of the present invention. The medical kit 800 comprises a medical (e.g. infusion) tube 700, which in turn comprises a schematically indicated coupling device 100. One or more elements may be connected to the medical tube via coupling arrangement(s) provided at end portions of the medical tube 700, wherein the coupling arrangement(s) may be of standardized type for coupling to different kinds of elements. For example, and as shown in FIG. 7, an element 810 is connected to an end portion of the medical tube 700, wherein the element 810 is arranged for insertion into a patient and configured to transfer a fluid to and/or from a patient. Furthermore, at the other end of the medical tube 700, the medical tube 700 is coupled to a container 820 (e.g. an infusion bag) arranged to supply a (infusion) fluid to a patient via the medical tube 700 and the element 810. It will be appreciated that the medical tube 700 may comprise a plurality of coupling devices 100 although FIG. 7 merely shows the use of one coupling device 100 for reasons of simplicity. The coupling device 100 may furthermore comprise at least one coupling arrangement, e.g. arranged at one or both ends of the coupling device 100, for coupling to different kinds of elements. Furthermore, the coupling arrangement(s) may be of substantially any type, e.g. a standardized coupling which may be possible to couple to many different kinds of elements. For example, the coupling arrangement(s) may comprise a coupling of Luer lock type and/or Luer slip type.

The person skilled in the art realizes that the present invention by no means is limited to the preferred embodiments described above. On the contrary, many modifications and variations are possible within the scope of the appended claims. For example, it will be appreciated that the figures are merely schematic views of a coupling device 100 according to embodiments of the present invention. Hence, any elements/components of the coupling device may have different dimensions, shapes and/or sizes than those depicted and/or described.

The invention claimed is:

1. A coupling device for transferring a fluid, the coupling device comprising;
    a first housing extending along a principal axis, the first housing comprising a first opening at a back end portion thereof, a second opening at a front end portion thereof, a tube extending from the first opening into the first housing along the principal axis, and a first sealing element,
    a second housing comprising a channel through the second housing, and a second sealing element arranged to seal the channel, wherein at least one of the first and second sealing elements comprises an antimicrobial coating, and
    a cavity on a front side of the respective first and second sealing element,
    whereby, at a first stage of a connection of the coupling device,
    the second housing is insertable into the first housing via the second opening thereof, wherein the first and second sealing elements are configured to abut each other and sealingly separate the tube and the channel, wherein the cavity of at least one of the first and second sealing elements defines a first space upon contact between the first and second sealing elements,
    whereby, at a second stage of the connection of the coupling device,
    the tube projects through the first and second sealing elements for connection with the channel for enabling a transfer of fluid through the coupling device,
    whereby, at a first stage of a disconnection of the coupling device, wherein the tube is retracted through the first and second sealing elements and an end portion of the tube is enclosed by the second sealing element,
    the tube and the second sealing element are configured to define a second space at the end portion of the tube, wherein the second space is at least partially filled with the fluid, and
    whereby, at a second stage of the disconnection of the coupling device, wherein the tube is retracted through the first sealing element and the end portion of the tube is in close vicinity of the second sealing element,
    the fluid in the second space is released into the first space upon collapse of the second space, and wherein the fluid in the first space comes into contact with at least one of at least a portion of the antimicrobial coating of the first sealing element and at least a portion of the antimicrobial coating of the second sealing element,
    wherein the antimicrobial coating is configured to provide an antimicrobial effect upon contact with the fluid.

2. The coupling device according to claim 1, wherein the antimicrobial coating comprises synthetic antimicrobial peptides.

3. The coupling device according to claim 1, wherein at least one of the first and second sealing elements comprises a guiding hole extending along the principal axis, A, wherein the guiding hole is arranged to guide the tube through the at least one of the first and second sealing elements.

4. The coupling device according to claim 1, wherein at least one of the first and second sealing elements comprises a resilient membrane, wherein the resilient membrane has a convex shape which is configured to flatten upon abutment of the first sealing element with the second sealing element.

5. The coupling device according to claim 1, further comprising at least one third housing displaceably arranged within the first housing along the principal axis, A, between a first position at the front end portion of the first housing and a second position at the back end portion of the first housing, wherein the third housing encloses the first sealing element.

6. The coupling device according to claim 5, wherein at the first stage of the connection of the coupling device, the second housing is releasably connectable to the third housing and configured for displaceable arrangement within the first housing along the principal axis.

7. The coupling device according to claim 6, wherein the second housing is insertable between the first housing and the first sealing element.

8. The coupling device according to claim 5, further comprising a locking arrangement, whereby the third housing, in the second position, is releasably connected to the first housing via the locking arrangement.

9. The coupling device according to claim 5, whereby in case of a force applied on the second housing connected to the third housing in the second position along the principal axis towards the first position exceeds a predetermined threshold, the third housing is configured to be released from a connection to the first housing in the second position, the third housing is configured to be displaced from the second position into the first position, and the second housing is configured to be released from a connection to the third housing.

10. The coupling device according to claim 5, further comprising a locking mechanism (500) for releasable connection of the second housing to the third housing.

11. The coupling device of claim 10, wherein the second housing comprises a first locking element of the locking mechanism, and the third housing comprises a second locking element of the locking mechanism, wherein the first and second locking elements are configured to releasably lock upon rotation of the first and second locking elements with respect to each other.

12. The coupling device of claim 11, wherein, during a displacement of the third housing and second housing from the first position to the second position, the second locking element is configured to rotate with respect to the first locking element for mating engagement with the first locking element such that the second housing and the third housing are connected in the second position, and during a displacement of the third housing and second housing from the second position to the first position, the second locking element is configured to rotate with respect to the first locking element for disengaging the mating engagement such that the second housing and the third housing are disconnected in the first position.

13. A medical tube for transferring a fluid to or from a patient, wherein the medical tube comprises at least one coupling device according to claim 1.

14. A medical kit, comprising
    at least one medical tube according to claim 13, further comprising at least one coupling arrangement provided at at least one end thereof, and
    at least one element connected to the medical tube via the at least one coupling arrangement.

* * * * *